No. 661,468. Patented Nov. 6, 1900.
C. P. CONRAD.
BACK PEDALING BRAKE.
(Application filed Nov. 13, 1899.)

(No Model.) 2 Sheets—Sheet 1.

WITNESSES:
D. H. Foreman
Grace Mytinger

INVENTOR.
C. P. Conrad.
BY
ATTORNEY.

No. 661,468. Patented Nov. 6, 1900.
C. P. CONRAD.
BACK PEDALING BRAKE.
(Application filed Nov. 13, 1899.)
(No Model.) 2 Sheets—Sheet 2.
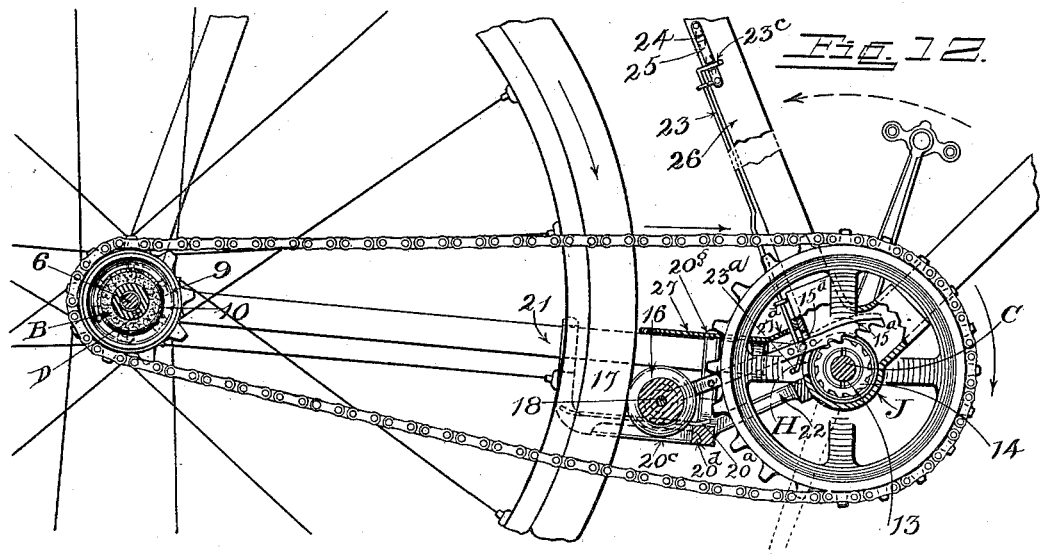
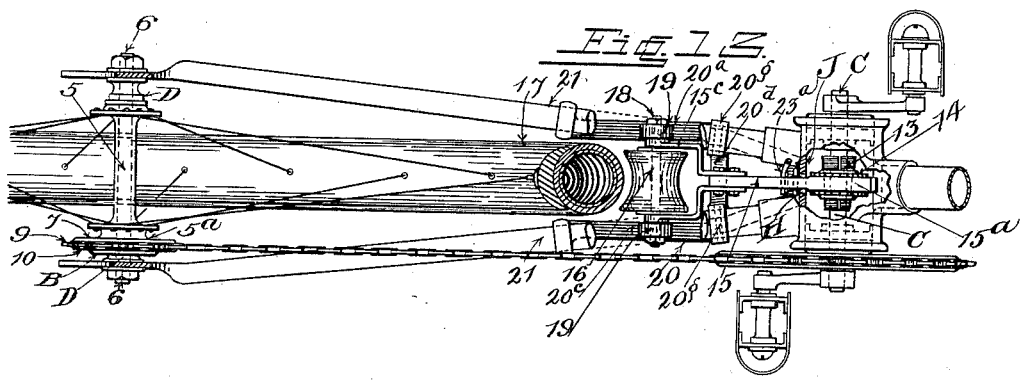
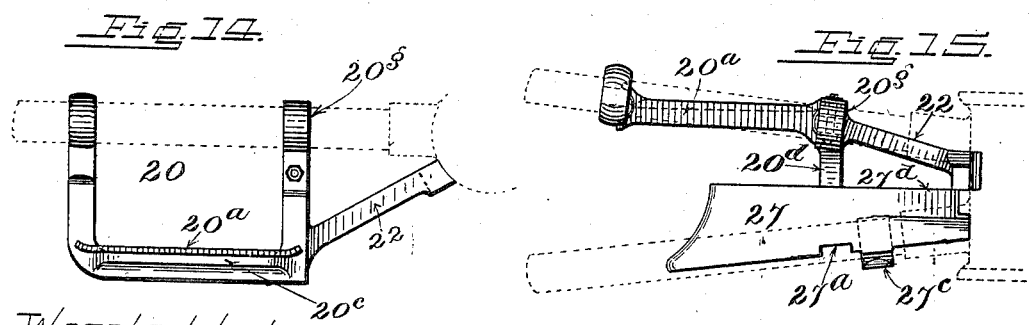
WITNESSES:
INVENTOR.
C. P. Conrad.
ATTORNEY.

UNITED STATES PATENT OFFICE.

CHARLES P. CONRAD, OF ELYRIA, COLORADO, ASSIGNOR, BY MESNE ASSIGNMENTS, TO THE CONRAD MANUFACTURING COMPANY, OF DENVER, COLORADO.

BACK-PEDALING BRAKE.

SPECIFICATION forming part of Letters Patent No. 661,468, dated November 6, 1900.

Application filed November 13, 1899. Serial No. 736,797. (No model.)

*To all whom it may concern:*

Be it known that I, CHARLES P. CONRAD, a citizen of the United States of America, residing at Elyria, in the county of Arapahoe and State of Colorado, have invented certain new and useful Improvements in a Combined Coasting Sprocket-Wheel and Brake; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in a combined coasting sprocket-wheel and brake, my object being to provide a device of this class which shall be simple in construction, economical in cost, reliable, durable, and efficient in use; and to these ends the invention consists of the features, arrangements, and combinations hereinafter described and claimed, all of which will be fully understood by reference to the accompanying drawings, in which is illustrated an embodiment thereof.

Figure 1:
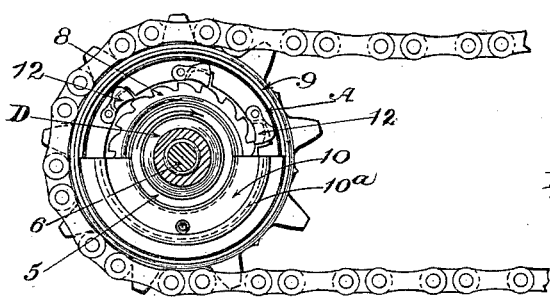
Figure 2:
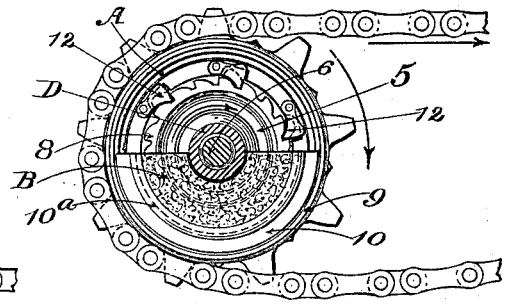
Figure 3:
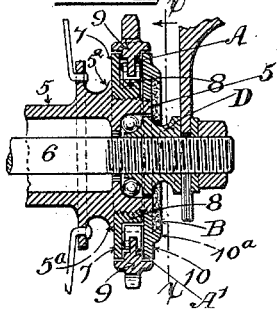
Figure 4:
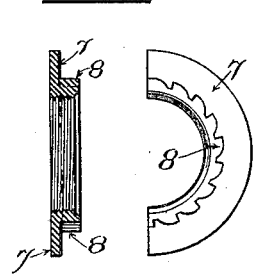
Figure 5:
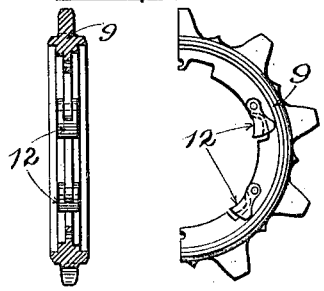
Figure 6:
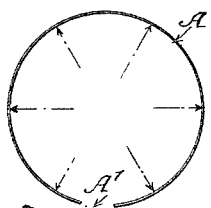
Figure 7:
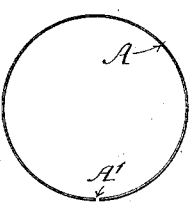
Figure 8:
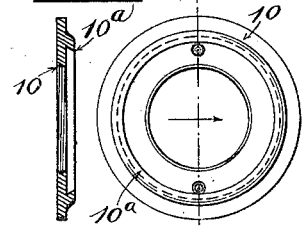
Figure 9:
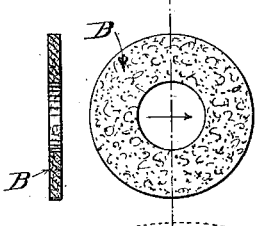
Figure 10:
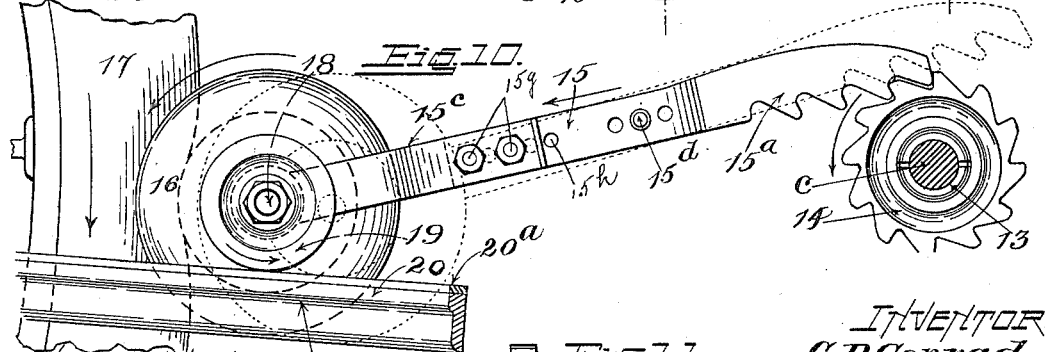
Figure 11:
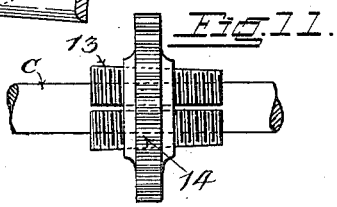

In the drawings, Figure 1 is a side elevation of the coasting-sprocket, with the upper half of the outer plate removed, showing the ratchet-ring and the position of the dogs when coasting or back-pedaling to apply the brake. Fig. 2 is a similar view showing the dogs in normal engagement with the ratchet-ring when pedaling, also showing half of the dust-excluding washer. The sectionized parts in Figs. 1 and 2 are taken on the line X X, Fig. 3, the parts being viewed in the direction of the arrow. Fig. 3 is a fragmentary section taken through my improved coasting-sprocket mechanism and the hub of the rear wheel. Fig. 4 shows a section and a face view of half of the coasting-ratchet. Fig. 5 is a section and a face view of half of the sprocket-rim, showing the dogs which engage the coasting-ratchet when the parts are assembled. Fig. 6 is a detail view of the dog-engaging spring-ring, shown in the expanded position corresponding to the position of the dogs in Fig. 1. Fig. 7 is a detail view of the same, shown in the contracted position corresponding to the position of the dogs in Fig. 2. Fig. 8 shows a section and a face view of the outer plate provided with an annular dovetailed groove adapted to receive and retain the dust-excluding washer. Fig. 9 is a section and a face view of the dust-excluding washer. Fig. 10 is a section taken through the crank-shaft, showing the brake mechanism in side elevation. Fig. 11 is a fragmentary view of the crank-shaft, illustrating the manner of fastening the brake-ratchet thereon. Fig. 12 is a fragmentary side elevation of a bicycle, illustrating my improvements, parts being shown in section. In this view the broken-line arrow indicates the direction of the pedal's movement to set the brake, while the full-line arrows indicate the direction of the bicycle-wheel's travel, also the normal direction of the sprocket's movement. Fig. 13 is a plan view of the same, shown in horizontal section. Fig. 14 is a side elevation of the friction-stirrup. Fig. 15 is a top view illustrating half of the housing for protecting the brake devices, the other half being removed to disclose the friction-stirrup beneath.

Similar reference characters indicating corresponding parts in these views, let the numeral 5 designate the hub of the rear wheel and 6 the spindle upon which the hub is journaled, the usual cones and ball-bearings being employed. To one extremity of this hub is applied my improved coasting-sprocket mechanism, comprising an inner plate 7, a ratchet-ring 8, formed integral therewith, the sprocket-rim 9, and the outer plate 10. The plate 7 and the ring 8 are screwed upon the hub 5 against the shoulder $5^a$, while the outer plate 10, which is provided with a left-hand thread, is screwed upon the outer extremity of the hub. The sprocket-rim is located between the plates 7 and 10, which engage shoulders thereon and maintain the sprocket in place. This sprocket-rim carries dogs 12, which are pivotally mounted thereon and adapted to engage the teeth of the ratchet 8 when the mechanism is operated by the pedal-cranks and in the usual manner. While coasting, however, the sprocket-rim, together with the chain and pedal-cranks, remain stationary, and the teeth of the ratchet slip past the dogs 12, since the hub is turning in the direction indicated by the arrow in Figs. 1 and 2.

Outside of the dogs 12 is located a ring A, divided, as shown at A', to permit expansion and contraction. The function of this spring-ring is to simultaneously return the dogs to engagement with the teeth of the ratchet-ring 8 as soon as the rider begins to pedal forward. Without this ring only one or more pawls in position to act by gravity would engage the ratchet. My improvement insures the positive and instantaneous locking of the sprocket-rim on the ratchet-ring when the rider ceases to coast and begins the forward-pedaling action. The outer plate 10 is provided with an annular dovetailed or undercut groove $10^a$, into which is fitted a washer B, composed of felt or other suitable material. This washer fits tightly around the cone D and excludes dust from the bearings.

On the crank-shaft C is fitted, by means of a taper-threaded split sleeve 13, a ratchet-wheel 14, which is centrally located and fast on the shaft, the tendency of the braking action being to screw the ratchet, which is interiorly threaded, tighter on the shaft or the threaded taper-sleeve engaging the shaft, as specified. Passing through an opening H, formed in the center bearing J of the frame for the purpose, is an arm 15, whose inner or concealed extremity $15^a$ is toothed to engage the teeth of the ratchet 14 when the rider back-pedals. The ratchet and toothed arm, however, are so arranged that normally or during the forward-pedaling action the ratchet turns freely with the shaft. The rear extremity of the arm 15, which is downwardly inclined, is provided with a number of openings $15^h$ and is adjustably secured to a fork $15^e$ by bolts $15^g$, said fork being adapted to straddle a revoluble spool 16, having a concave periphery adapted to engage the tire 17 of the rear bicycle-wheel. The spool is fast on a spindle 18, journaled in the fork-arms. A small friction-wheel 19 is also fast on each extremity of the spindle, being located outside the fork-arm member. Each of these friction-wheels engages the lower part $20^c$ of a stirrup-shaped friction device 20, supported on one of the frame-bars 21 of the bicycle. The friction-wheel-engaging portions of the stirrups are provided with a covering $20^a$, of leather or other suitable material, adapted to increase the friction and arrest the noise or sound incident to the engaging of metal parts. The parts $20^c$ of the stirrups are preferably inclined downwardly (see Fig. 10) as they extend forwardly, whereby the spool and friction-wheels have a tendency to move away from the tire of the bicycle automatically when not in use. These friction-stirrups are connected by a cross-piece $20^d$ and are still further supported by forwardly-extending arms 22, connected with the center bearing.

In the operation of the device it is only necessary for the rider when he desires to coast to stop pedaling and the machine will move on while the pedal-cranks, chain, and sprocket-wheels remain stationary. In this case the hub 5 and the ratchet 8 of the rear wheel turn in the direction indicated by the arrows in Figs. 1 and 2. Then to check the speed of the wheel it is only necessary to turn the crank-shaft in the backward direction by a back-pedaling movement sufficiently to cause the brake-ratchet 14 to engage the teeth $15^a$ of the arm 15, whereby the said arm is forced rearwardly sufficiently to force the spool 16 against the tire 17. The friction between the tire and the spool will rotate the latter and at the same time force the friction-wheels 19 down tightly against the leather-faced parts of the stirrups 20, thus applying the brake, the braking function being performed by the friction between the said wheels and the friction-faces of the stirrups. By virtue of this construction the tire is practically relieved from braking wear, since there is a rolling contact between the spool and the tire.

A rod 23, normally mounted on the frame of the bicycle and provided with a hooked lower extremity $23^a$, may be employed to support the brake-arm 15 in the inoperative position when for any reason it may be desired to move the bicycle rearwardly without setting the brake. The upper extremity $23^c$ of the rod 23 is also bent to engage locking or holding recesses 24, formed in a device 25, attached to a frame 26.

The brake-arm 15 is provided with a cross-pin $15^d$, adapted to engage the center bearing and limit the forward movement of the arm.

Attached to the frame-bars 21, located above the brake-setting devices, is a plate 27, provided with recesses $27^a$ to receive the stirrup parts $20^g$, which pass around the frame-bar 21. This plate is provided with depending metal straps or hooks $27^c$, adapted to embrace the frame-bars 21, whereby the said plate is held securely in place. The forward part $27^d$ of this plate engages the frame just above the center bearing. The function of this plate is to protect the brake-setting devices from dirt which otherwise might interfere with the proper working of the brake-setting devices. Hence it is termed a "housing-plate."

Having thus described my invention, what I claim is—

1. The combination with the hub of the rear wheel, of the coasting-sprocket mechanism applied to one extremity thereof and comprising the inner and outer plates suitably separated, an intermediate ratchet-ring, a sprocket-rim surrounding the ratchet-ring and located between the two plates, dogs pivotally mounted on the sprocket-rim and adapted to engage the ratchet-ring, and a split spring-ring surrounding the dogs and having a tendency to throw them to locking engagement with the ratchet-ring.

2. The combination with a coasting-sprocket mounted on the hub of the rear wheel and adapted to clutch the hub when the sprocket turns but allowing the hub to turn freely in the sprocket when the latter is stationary, of coöperating brake mechanism comprising a ratchet-wheel fast on the crank-shaft, a toothed arm adapted to engage the ratchet, a spool connected with the toothed arm and adapted to engage the tire of the rear wheel, a friction-wheel operated by the spool and a friction-face engaged by the friction-wheel.

3. The combination with a coasting-sprocket mounted on the hub of the rear wheel and adapted to clutch the hub when the sprocket turns but allowing the hub to turn freely in the sprocket when the latter is stationary, of a ratchet-wheel fast on the crank-shaft, a toothed arm adapted to engage said ratchet, a spindle journaled in the forked rear extremity of said arm, a spool fast on the spindle and adapted to engage the tire, a friction-wheel fast on each extremity of the spindle, and a stirrup-shaped device supported on the frame and adapted to engage each friction-wheel.

4. The combination with a coasting-sprocket mounted on the hub of the rear wheel and adapted to clutch the hub when the sprocket turns but allowing the hub to turn freely in the sprocket when the latter is stationary, of a bicycle-brake comprising a revoluble spool fast on its axle, an arm in which the spool is journaled, a stirrup mounted on the frame and faced with leather or similar material, a wheel operated by the spool and engaging the friction-face of the stirrup, and means mounted on the crank-shaft and engaging the spool-arm for forcing the spool against the tire.

5. The combination with a coasting-sprocket mounted on the hub of the rear wheel and adapted to clutch the hub when the sprocket turns, but allowing the hub to turn freely in the sprocket when the latter is stationary, a pair of stirrup-shaped devices mounted on the frame of the bicycle, their lower parts being downwardly inclined as they extend forwardly, an arm whose forward extremity is toothed and whose rear extremity is forked, a spindle journaled in the forked extremity of the arm, a spool fast on the spindle, a friction-wheel fast on each extremity of the spindle and adapted to engage the inclined parts of the stirrups, whereby the tendency of the spool is to assume the forward position disengaged from the tire, and a ratchet-wheel fast on the crank-shaft and adapted to engage the toothed extremity of the arm.

6. The combination with a coasting-sprocket mounted on the hub of the rear wheel and adapted to clutch the hub when the sprocket turns but allowing the hub to turn freely in the sprocket when the latter is stationary, of a ratchet-wheel fast on the crank-shaft of a bicycle, a toothed arm adapted to engage said ratchet, a spool adjustably mounted on said arm and adapted to engage the tire of the bicycle-wheel, a friction-roller operated by the spool, a friction-support engaged by the roller and means for supporting the toothed arm out of engagement with the ratchet-wheel when it is not desired to operate the brake.

7. The combination with a coasting-sprocket mounted on the hub of the rear wheel, and adapted to clutch the hub when the sprocket turns, but allowing the hub to turn freely in the sprocket when the latter is stationary, of a ratchet-wheel fast on the crank-shaft of a bicycle, a toothed arm adapted to engage said ratchet, a spool mounted on said arm and adapted to engage the tire of the bicycle-wheel, a friction-roller operated by the spool, a friction-support engaged by the roller, and a housing-plate mounted on the frame above the brake-setting devices.

8. The combination with the hub of the rear wheel, of coasting-sprocket mechanism applied to one extremity thereof and comprising the inner and outer plates suitably separated, the outer plate being provided with an annular groove in its outer surface, a dust-excluding washer located in said groove, a ratchet-ring located between the two plates, a sprocket-rim surrounding the ratchet-ring and also located between the two plates, dogs pivotally mounted on the sprocket-rim, and a split spring-ring surrounding the dogs.

In testimony whereof I affix my signature in presence of two witnesses.

CHARLES P. CONRAD.

Witnesses:
GRACE MYTINGER,
A. J. O'BRIEN.